United States Patent
Wang et al.

(10) Patent No.: US 12,482,861 B2
(45) Date of Patent: Nov. 25, 2025

(54) ELECTROLYTE AND PREPARATION METHOD THEREOF AND LITHIUM ION BATTERY

(71) Applicant: Zhuhai CosMX Battery Co., Ltd., Zhuhai (CN)

(72) Inventors: Hai Wang, Zhuhai (CN); Suli Li, Zhuhai (CN); Bo Liao, Zhuhai (CN); Yingdi Mu, Zhuhai (CN); Junyi Li, Zhuhai (CN); Yanming Xu, Zhuhai (CN)

(73) Assignee: ZHUHAI COSMX BATTERY CO., LTD. (CN)

( * ) Notice: Subject to any disclaimer, the term of this patent is extended or adjusted under 35 U.S.C. 154(b) by 684 days.

(21) Appl. No.: 17/590,957

(22) Filed: Feb. 2, 2022

(65) Prior Publication Data
US 2022/0158242 A1 May 19, 2022

Related U.S. Application Data

(63) Continuation of application No. PCT/CN2020/107415, filed on Aug. 6, 2020.

(30) Foreign Application Priority Data

Aug. 6, 2019 (CN) .......................... 201910722002.4

(51) Int. Cl.
  H01M 10/0567 (2010.01)
  C07D 327/10 (2006.01)
  H01M 10/0525 (2010.01)
  H01M 10/0568 (2010.01)
  H01M 10/0569 (2010.01)

(52) U.S. Cl.
  CPC ...... H01M 10/0567 (2013.01); C07D 327/10 (2013.01); H01M 10/0525 (2013.01); H01M 10/0568 (2013.01); H01M 10/0569 (2013.01); H01M 2300/0025 (2013.01)

(58) Field of Classification Search
None
See application file for complete search history.

(56) References Cited

U.S. PATENT DOCUMENTS

2013/0071733 A1   3/2013  Abe et al.
2017/0346127 A1*  11/2017 Zhang .................. H01M 4/131

FOREIGN PATENT DOCUMENTS

| CN | 1891700 A | 1/2007 |
|---|---|---|
| CN | 103208653 A | 7/2013 |
| CN | 105810998 A | 7/2016 |
| CN | 106905291 A | 6/2017 |
| CN | 109148950 A | 1/2019 |
| CN | 109273765 A | 1/2019 |
| JP | 2018049821 A | 3/2018 |
| JP | 2019075320 A | 5/2019 |
| KR | 20180136655 A * | 12/2018 |
| WO | 2019039346 A1 | 2/2019 |

OTHER PUBLICATIONS

Machine translation of KR20180136655A (Year: 2018).*
First Office Action in CN Patent Application No. 201910722002.4 dated Jul. 22, 2021.
Hu, Xianfeng et al, 2,2'-dioxide: A novel cathode additive for high-voltage performance in lithium ion batteries, Journal of Power Sources, Dec. 16, 2017, pp. 112-118.
International Search Report in International Application No. PCT/CN2020/107415 dated Nov. 10, 2020.
Notice of Allowance in CN Patent Application No. 201910722002.4 dated Jan. 14, 2022.

* cited by examiner

Primary Examiner — Jonathan G Leong
Assistant Examiner — Taeyoung Son
(74) Attorney, Agent, or Firm — Dilworth IP, LLC

(57) ABSTRACT

An electrolyte and a preparation method thereof and a lithium ion battery, where the electrolyte comprises the following components in percentages by mass: 10-20% of a lithium salt, 0.2-7% of an additive composition and a balance of a solvent; among them, the additive composition comprises a boron-containing lithium salt compound and a sulfur-based compound represented by Formula 1, in which $R_1$ and $R_3$ are each independently selected from hydrogen, halogen, or substituted or unsubstituted alkyl; $R_2$ is selected from a substituted or unsubstituted alkylene, or is a direct bond; the boron-containing lithium salt compound is at least 0.1% by mass of the electrolyte. The electrolyte can significantly improve the performance of an SEI film, thereby facilitating increasing the cycle performance and storage performance of the lithium ion battery.

12 Claims, No Drawings

ELECTROLYTE AND PREPARATION METHOD THEREOF AND LITHIUM ION BATTERY

CROSS-REFERENCE TO RELATED APPLICATION

The present application is a continuation of International Application No. PCT/CN2020/107415, filed on Aug. 6, 2020, which claims the priority to Chinese Patent Application No. 201910722002.4, filed on Aug. 6, 2019 with the China National Intellectual Property Administration, entitled "Electrolyte and Preparation Method thereof and Lithium Ion Battery", the entire contents of the above applications are hereby incorporated by reference.

TECHNICAL FIELD

The present application relates to an electrolyte and a preparation method thereof and a lithium ion battery, which belongs to the technical field of lithium ion batteries.

BACKGROUND

In recent years, the lithium ion battery as a secondary battery has been rapidly developed and widely used. At present, the composition of a lithium ion battery mainly includes a positive electrode, a negative electrode, a diaphragm, and an electrolyte. Among them, in the first charge and discharge process of the lithium ion battery, the electrode materials and the electrolyte react on the surface of the electrode material, forming a passivation layer covering the surface of the electrode material, i.e., an interfacial film with solid electrolyte characteristics as often referred to in this field (solid electrolyte interface, abbreviated: SEI film).

The SEI film has a very important impact on the performance of lithium ion battery. On one hand, the SEI film may prevent further contact between the electrolyte and the electrode material, suppressing the side reaction of the electrolyte occurred on the surface of the electrode material, thereby facilitating the increase in the cycle performance of the lithium ion battery; on the other hand, the generation of SEI film will also consume part of lithium ions in the electrolyte, thereby reducing the capacitance of the lithium ion battery.

Therefore, the formation of a SEI film having excellent performance on the surface of the electrode to significantly optimize the working performance of the lithium ion battery is an urgent technical problem to be solved in the field.

SUMMARY

In view of the above defect, the present application provides an electrolyte which, when used in a lithium ion battery, may significantly improve the performance of the SEI film, thereby facilitating increasing the cycle performance and storage performance of the lithium ion battery.

The present application further provides a preparation method of an electrolyte, which is simple and easy to implement, and contributes to safe and efficient preparation of an electrolyte capable of improving the cycle performance and storage performance of a lithium-ion battery.

The present application further provides a lithium ion battery containing the above electrolyte, so the lithium ion battery has excellent cycle performance and storage performance.

The present application provides an electrolyte including the following components in percentages by mass: 10-20% of a lithium salt, 0.2-7% of an additive composition, and a balance of a solvent;

Among them, the additive composition includes a boron-containing lithium salt compound and a sulfur-based compound represented by Formula 1,

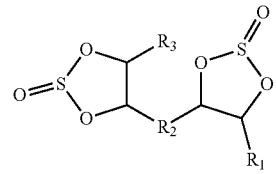

Formula 1 in which $R_1$ and $R_3$ are each independently selected from hydrogen, halogen, or a substituted or unsubstituted alkyl;

$R_2$ is selected from a substituted or unsubstituted alkylene or is a direct bond; and the boron-containing lithium salt compound is at least 0.1% by mass of the electrolyte.

In the electrolyte as described above, the sulfur-based compound is 0.1-5% by mass of the electrolyte.

In the electrolyte as described above, the sulfur-based compound is 0.1-2% by mass of the electrolyte.

In the electrolyte as described above, the boron-containing lithium salt compound is 0.1-2% by mass of the electrolyte.

In the electrolyte as described above, the sulfur-based compound is specifically selected from at least one of the compounds shown in T1-T4:

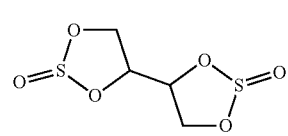

T1

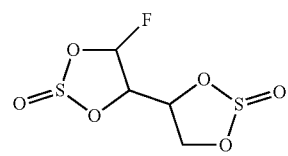

T2

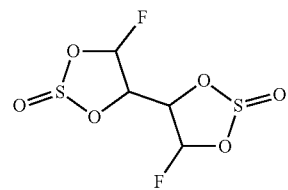

T3

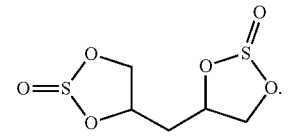

T4

In the electrolyte as described above, the boron-containing lithium salt compound is selected from at least one of lithium difluoroacetate borate, lithium bisoxalate borate and lithium tetrafluoroborate.

In the electrolyte as described above, the solvent includes at least one of ethylene carbonate and propylene carbonate.

In the electrolyte as described above, the ethylene carbonate and/or propylene carbonate is 10-50% by mass of the electrolyte.

The present application further provides a preparation method of the electrolyte according to any one described above, including:

mixing a solvent, a lithium salt, and an additive composition under an inert atmosphere to obtain the electrolyte.

The present application further provides a lithium ion battery, and an electrolyte of the lithium ion battery is the electrolyte according to any one described above.

The implementation of the present application has at least the following advantages:

1. The electrolyte provided by the present application, by adding a particular additive composition, is capable of forming a stable and strong SEI film on the surface of the electrode in preference to other components in the electrolyte, thereby effectively preventing the electrolyte from contacting with the electrode, significantly improving cycle performance and storage performance of the lithium ion battery;

2. the preparation method of the electrolyte provided by the present application is simple in process, strong in operability, which facilitates practical promotion and large-scale application; and 3. since the lithium ion battery provided by the present application includes the electrolyte described above in the present application, the lithium ion battery has excellent cycle performance and storage performance.

DESCRIPTION OF EMBODIMENTS

In order to make the object, technical solutions, and advantages of the embodiments of the present application more clear, the technical solutions in the embodiments of the present application will be described clearly and completely, and it is apparent that the described embodiments are part of the embodiments of the present application but not all embodiments. Based on the embodiments in the present application, all other embodiments obtained by those skilled in the art without creative labor are all in the scope protected by the present application.

The present application provides an electrolyte including the following components in percentages by mass: 10-20% of a lithium salt, 0.2-7% of an additive composition and a balance of a solvent.

Among them, the additive composition includes a boron-containing lithium salt compound and a sulfur-based compound represented by Formula 1,

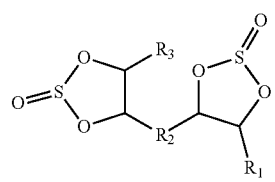

Formula 1 in which, $R_1$ and $R_3$ are each independently selected from hydrogen, halogen, or a substituted or unsubstituted alkyl;

$R_2$ is selected from a substituted or unsubstituted alkylene or is a direct bond; and the boron-containing lithium salt compound is at least 0.1% by mass of the electrolyte.

The additive composition of the present application is a combination of a boron-containing lithium salt compound and a sulfur-based compound represented by Formula 1, and the additive composition is 0.2-7% by mass of the electrolyte, and when the boron-containing lithium salt compound is at least 0.1% by mass of the electrolyte, it is possible to significantly increase the performance of the SEI film formed on the surface of the electrode when the lithium ion battery is first charged and discharged, thereby generating a positive impact on the cycle performance and storage performance of the lithium ion battery. The inventors analyzed the SEI film based on this phenomenon, and concluded that it may be that the additive composition may electrochemically react at a lower potential, thereby forming the SEI film including boron element and sulfur element on the surface of the electrode in preference to other components in the electrolyte, where the boron element facilitates reduction of the mass transfer impedance of lithium ions, and the sulfur element is present in the form of a polymer and facilitates increase of the strength of the SEI film.

Therefore, in the charge and discharge process of lithium ion battery, the lithium ion may pass through the SEI film at a lower resistance and thus complete intercalation and deintercalation on the electrode, thereby facilitating improving the intercalation and deintercalation of the lithium and dynamic stability of the interface between the electrode and the electrolyte, leading to significant improvement of the performance of the lithium ion battery, such as cycle life, self-discharge, rated rate, and temperature resistance of the battery, etc. The increased strength of the SEI film may prevent the SEI film from dissolving in the electrolyte, avoid damage to the electrode material due to cointercalation of solvent molecules, and ensure the insulation performance of the electrode from other particles or electrons, thereby further improving the cycle performance and storage performance of the electrode.

In Formula 1, $R_1$ and $R_3$ may be a substituted or unsubstituted $C_1$-$C_5$ linear alkyl, $C_3$-$C_5$ branched alkyl, or $C_3$-$C_5$ cycloalkyl; specifically, $R_1$ and $R_3$ may be one selected from a group consisting of —$CH_3$, —$CH_2CH_3$, —$C(CH_3)_3$, —$C(CH_3)_2F$, —$CH_2F$, —$CH_2(C_6H_6)$, —$CH(C_6H_6)$ $CH_2CH_3$, —$CH_2CH_2CH_2CH_2CH_3$ and —$CH_2C(CH_3)_3$; $R_2$ is selected from substituted or unsubstituted $C_1$-$C_{10}$ alkylene or is a direct bond; specifically, $R_2$ may be one selected from a group consisting of —$CH_2$—, —CHF—, —$CH_2CHFCH_2$—, —$CH_2CH_2$—, —$CH_2CHFCH_2$—, and —$CH_2C(CH_3)_2CH_2$—, wherein the direct bond means that the two five-membered rings are directly bonded and are not connected by any substituent.

The sulfur-based compound represented by Formula 1 of the present application may be commercially available or prepared by any feasible preparation method.

Further, a mass percent of the sulfur-based compound represented by Formula 1 in the electrolyte may be limited to 0.1-5%. Studies have shown that with the increase of the amount of sulfur-based compound in a certain range, the lithium ion battery have more excellent storage performance and cycle performance Certainly, use of different lithium salts and/or solvents in the electrolyte, even use of different positive electrode materials, negative electrode materials or diaphragms can affect the final performance of lithium ion battery. Thus, in general, when the mass percentage of the sulfur-based compound in the electrolyte is limited to 0.1%-2%, it essentially gives the lithium ion battery excellent performance.

Furthermore, when a mass percentage of the boron-containing lithium salt compound in the electrolyte is 0.1-2%, it is more adapted to the sulfur-based compound, which facilitates further enhancing the cycle performance and storage performance of the lithium ion battery.

Further, the sulfur-based compound according to the present application is specifically selected from at least one of the compounds shown in T1-T4:

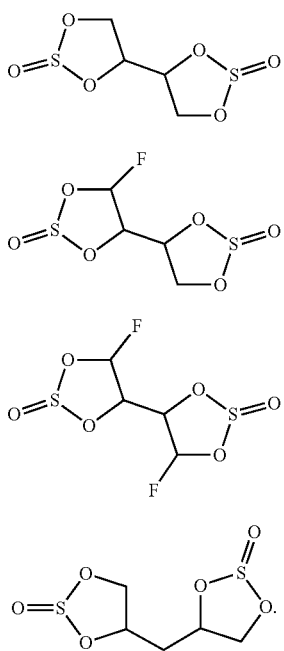

The boron-containing lithium salt compound of the present application is selected from at least one of lithium difluoroacetate borate (LiODFB), lithium bisoxalate borate (LiBOB), lithium tetrafluororate (LiBF$_4$). Certainly, if the boron-containing lithium salt compound is two or more of the above compounds, a ratio between the compounds is not particularly limited in the present application.

In the course of the inventors' research, it was found that when the solvent in the electrolyte includes at least one of ethylene carbonate and propylene carbonate, facilitating further optimizing the cycle performance and storage performance of the lithium ion battery. The inventors speculated that it may be that ethylene carbonate and propylene carbonate have an auxiliary action on the formation of the SEI film on the surface of the electrode by the above additive composition, and can accelerate the formation of the SEI film by the additive composition in preference to other components on the surface of the electrode, thereby increasing the amounts of sulfur element and boron element in the SEI film.

Further, when the mass percentage of ethylene carbonate and/or propylene carbonate in the electrolyte is 10-50%, the performance of the lithium ion battery may be further optimized.

That is, if the solvent includes one of ethylene carbonate and propylene carbonate, the mass percentage of ethylene carbonate or propylene carbonate in the electrolyte may be 10-50%; if the solvent includes ethylene carbonate and propylene carbonate, the mass percentage of a total amount of ethylene carbonate and propylene carbonate in the electrolyte may be 10-50%.

In addition to ethylene carbonate and/or propylene carbonate, the electrolyte of the present application may include one or more of other solvents commonly used in electrolytes of current lithium ion batteries, for example, butene carbonate, fluoroethylene carbonate (FEC), dimethyl carbonate (DMC), diethyl carbonate (DEC), difluoroethylene carbonate (DFEC), dipropyl carbonate, ethyl methyl carbonate (EMC), ethyl acetate, ethyl propionate, propyl acetate, propyl propionate, sulfolane, γ-butyrolactone and the like. Certainly, if the solvent in the electrolyte includes two or more of the above compounds, a ratio between the compounds is not particularly limited in the present application.

The lithium salt in the electrolyte is not particularly limited in the present application, and may be a lithium salt commonly used in the current lithium ion electrolytes, such as it may be selected from one or more of lithium hexafluorophosphate (LiPF$_6$), lithium bis(fluorosulfonyl) imide (LiFSI), and lithium bis(trifluoromethanesulfonyl) imide (LiTFSI). Certainly, if the lithium salt of the electrolyte includes two or more of the above compounds, a ratio between the compounds is not particularly limited in the present application.

The present application further provides a preparation method of the electrolyte according to any one described above, including: mixing a solvent, a lithium salt, and an additive composition in an inert atmosphere to obtain the electrolyte.

Specifically, it may be carried out in a glove box (moisture <1 ppm, oxygen <1 ppm) filled with argon.

During the preparation, the lithium salt and the additive composition may be added to the solvent, followed by stirring, to obtain the electrolyte of the present application. The order of adding the lithium salt and the additive composition is not limited in the present application, and the sulfur-based compound and the boron-containing lithium salt compound of the additive composition may be added together, or may be added separately.

The preparation method of the electrolyte of the present application is simple in operation and it may be completed only by mixing the materials and stirring, and thus the electrolyte can be prepared with high efficiency and low cost.

The present application further provides a lithium ion battery, and the electrolyte of the lithium ion battery is any one electrolyte as described above.

It may be come into mind that the lithium ion battery of the present application includes a positive electrode, a negative electrode, and a diaphragm, in addition to the above electrolyte.

An active material of the positive electrode is not strictly limited in the present application, and it may be an active material commonly used in a positive electrode of a current lithium ion battery, such as at least one of lithium cobaltate, lithium nickelate, lithium manganate, nickel-cobalt-manganese ternary material, nickel-cobalt-aluminium ternary material, lithium iron phosphate (LFP), lithium nickel manganate, and lithium-rich manganese-based material.

Specifically, in an operation, at least one active material of the positive electrode described above, conductive carbon black, conductive graphite and polyvinylidene fluoride as adhesive may be dispersed in a mass ratio of 96:1:1:2 into a suitable amount of N-methylpyrrolidone (NMP) solvent, followed by stirring fully and mixing, to form a uniform positive electrode slurry; the positive electrode slurry is coated uniformly on aluminium foil as a positive current collector, dried, rolled and slit, to obtain a positive electrode sheet.

An active material of the negative electrode is not strictly limited in the present application, and may be an active material commonly used in a negative electrode of a current lithium ion battery, such as at least one of artificial graphite, hard carbon, and soft carbon.

Specifically, in an operation, at least one active material of the negative electrode described above, conductive carbon black, styrene butadiene rubber (SBR) as adhesive and sodium carboxymethyl cellulose (CMC) as thickener are may be dispersed in a mass ratio of 96:1:1.5:1.5 into a suitable amount of deionized water as solvent, followed by stirring fully and mixing to form a uniform negative electrode slurry; the negative electrode slurry is coated uniformly on a copper foil as a negative current collector, dried, rolled and slit, to obtain a negative electrode sheet.

A material of the diaphragm is not limited in the present application, and may be a diaphragm material commonly used in a current lithium ion battery, such as at least one of polypropylene (PP) diaphragm, polyethylene (PE) diaphragm, polypropylene/polyethylene (PP/PE) double-layer composite diaphragm, polyimide (PI) electrostatic spinning diaphragm, polypropylene/polyethylene/polypropylene (PP/PE/PP) three-layer composite diaphragm, cellulose non-woven fabric diaphragm, and ceramic-coated diaphragm.

In the preparation of a lithium ion battery, the positive electrode sheet, the diaphragm, and the negative electrode sheet are wound to obtain a bare cell, and the cell is packaged into a pre-stamped aluminum-plastic film bag. After the packaged battery is dried at 85° C. to remove water, the electrolyte of the present application is injected into the dried battery, and the battery is set aside, chemically formed and secondary sealed, to complete preparation of the lithium ion battery.

Due to the inclusion of the aforementioned electrolyte, the lithium ion battery of the present application is capable of forming the SEI film having excellent performance on the surface of the electrode during the first charge and discharge process, giving the lithium ion battery of the present application excellent cycle performance and storage performance.

Hereinafter, the electrolyte and the preparation method thereof and the lithium ion battery of the present application will be introduced in detail by specific examples.

Example 1

The electrolyte of this example is prepared according to the following method:

In a glove box filled with argon (moisture <1 ppm, oxygen <1 ppm), ethylene carbonate (EC), propylene carbonate (PC), diethyl carbonate (DEC), and propyl propionate (PP) were mixed uniformly in a mass ratio of 15:15:15:55, and $LiPF_6$ was slowly added into the mixed solution, followed by stirring until it was completely dissolved, and then the sulfur-based compound shown by T1 and LiODFB were successively added, to obtain an electrolyte of Example 1.

In the electrolyte of this example, the solvent accounts for 84.5% by mass of the electrolyte, where ethylene carbonate and propylene carbonate account for 25.35% by mass of the electrolyte, and $LiPF_6$ accounts for 13.5% by mass of the electrolyte; the sulfur-based compound shown in T1 accounts for 1% by mass of the electrolyte, and LiODFB accounts for 1% by mass of the electrolyte.

The electrolyte in Example 1 was combined with a lithium cobaltate positive electrode sheet, a diaphragm, and an artificial graphite negative electrode to assemble into a lithium ion battery 1 #.

Example 2

The preparation method of the electrolyte of this example is the same as that of Example 1, except that the sulfur-based compound shown in T1 in the electrolyte of this example accounts for 0.2% by mass of the electrolyte, and the solvent accounts for 85.3% by mass of the electrolyte, and $LiPF_6$ accounts for 13.5% by mass of the electrolyte, and LiODFB accounts for 1.0% by mass of the electrolyte.

The electrolyte in Example 2 was combined with a lithium cobaltate positive electrode sheet, a diaphragm, and an artificial graphite negative electrode to assemble into a lithium ion battery 2 #.

Example 3

The preparation method of the electrolyte of this example is the same as that of Example 1, except that the sulfur-based compound in the electrolyte of this example is a sulfur-based compound shown in T2 and the sulfur-based compound accounts for 0.5% by mass of the electrolyte, and the boron-containing lithium salt compound was LiBOB and LiBOB accounts for 1% by mass of the electrolyte, and the solvent accounts for 85% by mass of the electrolyte, and $LiPF_6$ accounts for 13.5% by mass of the electrolyte.

The electrolyte in Example 3 was combined with a lithium cobaltate positive electrode sheet, a diaphragm, and an artificial graphite negative electrode to assemble into a lithium ion battery 3 #.

Example 4

The preparation method of the electrolyte of this example is the same as that of Example 1, except that the sulfur-based compound in the electrolyte of this example is a sulfur-based compound shown in T3 and the sulfur-based compound accounts for 2% by mass of the electrolyte, and the boron-containing lithium salt compound is $LiBF_4$ and $LiBF_4$ accounts for 0.5% by mass of the electrolyte, and the solvent accounts for 84% by mass of the electrolyte, and $LiPF_6$ accounts for 13.5% by mass of the electrolyte.

The electrolyte in Example 4 was combined with a lithium cobaltate positive electrode sheet, a diaphragm, and an artificial graphite negative electrode to assemble into a lithium ion battery 4 #.

Example 5

The preparation method of the electrolyte of this example is the same as that of Example 1, except that the boron-containing lithium salt compound is $LiBF_4$ and the $LiBF_4$ accounts for 2% by mass of the electrolyte, and the sulfur-based compound shown in T1 accounts for 1% by mass of the electrolyte, and the solvent accounts for 83.5% by mass of the electrolyte, and $LiPF_6$ accounts for 13.5% by mass of the electrolyte.

The electrolyte in Example 5 was combined with a lithium cobaltate positive electrode sheet, a diaphragm, and an artificial graphite negative electrode to assemble into a lithium ion battery 5 #.

Example 6

The preparation method of the electrolyte of this example is the same as that of Example 1, except that the sulfur-based compound shown in T1 in the electrolyte of this example accounts for 2% by mass of the electrolyte, and the LiODFB accounts for 1% by mass of the electrolyte, and the solvent accounts for 83.5% by mass of the electrolyte, and $LiPF_6$ accounts for 13.5% by mass of the electrolyte.

The electrolyte in Example 6 was combined with a lithium cobaltate positive electrode sheet, a diaphragm, and an artificial graphite negative electrode to assemble into a lithium ion battery 6 #.

Example 7

The preparation method of the electrolyte of this example is the same as that of Example 1, except that the sulfur-based compound shown in T1 in the electrolyte of this example accounts for 4% by mass of the electrolyte, and the LiODFB accounts for 1% by mass of the electrolyte, and the solvent accounts for 81.5% by mass of the electrolyte, and $LiPF_6$ accounts for 13.5% by mass of the electrolyte.

The electrolyte in Example 7 was combined with a lithium cobaltate positive electrode sheet, a diaphragm, and an artificial graphite negative electrode to assemble into a lithium ion battery 7 #.

Example 8

The preparation method of the electrolyte of this example is the same as that of Example 1, except that LiODFB in the electrolyte of this example accounts for 2.5% by mass of the electrolyte, and the sulfur-based compound shown in T1 accounts for 1% by mass of the electrolyte, and the solvent accounts for 83% by mass of the electrolyte, and $LiPF_6$ accounts for 13.5% by mass of the electrolyte.

The electrolyte in Example 8 was combined with a lithium cobaltate positive electrode sheet, a diaphragm, and an artificial graphite negative electrode to assemble into a lithium ion battery 8 #.

Example 9

The preparation method of the electrolyte of this example is the same as that of Example 1, except that the solvent in the electrolyte of this example is DEC:PP=50:50, and the electrolyte contains no EC and PC.

The electrolyte in Example 9 was combined with a lithium cobaltate positive electrode sheet, a diaphragm, and an artificial graphite negative electrode to assemble into a lithium ion battery 9 #.

Example 10

The preparation method of the electrolyte of this example is the same as that of Example 1, except that in the electrolyte of this example, ethylene carbonate (EC), propylene carbonate (PC), diethyl carbonate (DEC) and propyl propionate (PP) in the solvent have a mass ratio of 5:5:50:40, and the solvent accounts for 84.5% by mass of the electrolyte, where ethylene carbonate and propylene carbonate account for 8.45% by mass of the electrolyte.

The electrolyte in Example 10 was combined with a lithium cobaltate positive electrode sheet, a diaphragm, and an artificial graphite negative electrode to assemble into a lithium ion battery 10 #.

Example 11

The preparation method of the electrolyte of this example is the same as that of Example 1, except that in the electrolyte of this example, ethylene carbonate (EC), propylene carbonate (PC), diethyl carbonate (DEC) and propyl propionate (PP) in the solvent have a mass ratio of 30:30:30:10, and the solvent accounts for 84.5% by mass of the electrolyte, where ethylene carbonate and propylene carbonate account for 50.7% by mass of the electrolyte.

The electrolyte in Example 11 was combined with a lithium cobaltate positive electrode sheet, a diaphragm, and an artificial graphite negative electrode to assemble into a lithium ion battery 11 #.

Example 12

The preparation method of the electrolyte of this example is the same as that of Example 1, except that the lithium salt in the electrolyte of this example is $LiPF_6$ and LiTFSI, and $LiPF_6$ and LiTFSI respectively account for 10% and 5% by mass of the electrolyte, and the sulfur-based compound shown in T1 accounts for 0.5% by mass of the electrolyte, and the boron-containing lithium salt compound is LiBOB and LiBOB accounts for 1% by mass of the electrolyte.

The electrolyte in Example 12 was combined with a lithium cobaltate positive electrode sheet, a diaphragm, and an artificial graphite negative electrode to assemble into a lithium ion battery 12 #.

Example 13

The preparation method of the electrolyte of this example is the same as that of Example 1, except that the lithium salt in the electrolyte of this example is $LiPF_6$ and LiFSI, and $LiPF_6$ and LiFSI respectively account for 10% and 5% by mass of the electrolyte, and the sulfur-based compound shown in T1 accounts for 1% by mass of the electrolyte, and the LiODFB accounts for 1% by mass of the electrolyte.

The electrolyte in Example 13 was combined with a lithium cobaltate positive electrode sheet, a diaphragm, and an artificial graphite negative electrode to assemble into a lithium ion battery 13 #.

Comparative Example 1

The preparation method of the electrolyte of this comparative example is the same as in Example 1, except that the additive in the electrolyte of this comparative example only includes the compound shown in T1, and the compound shown in T1 accounts for 1% by mass of the electrolyte, and the solvent accounts for 85.5% by mass of the electrolyte, and $LiPF_6$ accounts for 13.5% by mass of the electrolyte.

The electrolyte in Comparative Example 1 was combined with a lithium cobaltate positive electrode sheet, a diaphragm, and an artificial graphite negative electrode to assemble into a lithium ion battery 14 #.

Comparative Example 2

The preparation method of the electrolyte of this comparative example is the same as that of Example 1, except that the additive in the electrolyte of this comparative example only includes LiODFB, and LiODFB accounts for 1% by mass of the electrolyte, and the solvent accounts for 85.5% by mass of the electrolyte, and $LiPF_6$ accounts for 13.5% by mass of the electrolyte.

The electrolyte in Comparative Example 2 was combined with a lithium cobaltate positive electrode sheet, a diaphragm, and an artificial graphite negative electrode to assemble into a lithium ion battery 15 #.

Comparative Example 3

The preparation method of the electrolyte of this comparative example is the same as that of Example 1, except that the LiODFB in the electrolyte of this comparative example accounts for 0.01% by mass of the electrolyte, and the sulfur-based compound shown in T1 accounts for 1% by mass of the electrolyte, and the solvent accounts for 85.49% by mass of the electrolyte, and $LiPF_6$ accounts for 13.5% by mass of the electrolyte.

The electrolyte in Comparative Example 3 was combined with a lithium cobaltate positive electrode sheet, a diaphragm, and an artificial graphite negative electrode to assemble into a lithium ion battery 16 #.

Electrochemical performance of the above lithium ion batteries 1-16 # are tested as specifically described below:

1. Cycle Experiment at Normal Temperature

The lithium ion batteries 1-16 # was placed in an environment at (25±2) ° C., the batteries were charged at a constant current of 1 C to 4.45V with a cut-off current of 0.02C, stand for 5 min after the batteries are fully charged, then discharged at a constant current of 1 C until to a cut-off voltage of 3.0V. The highest discharge capacity of the first 3 cycles was recorded as an initial capacity Q, and when the cycle reached 200 times, the last discharge capacities Q1 of the lithium ion batteries were recorded, and the capacity retention rate after 200 cycles at normal temperature was calculated according to the following equation, and the results are shown in Table 1.

$$\text{Capacity retention rate (\%)} = \frac{Q_1}{Q} \times 100$$

2. Storage Experiment at High Temperature

The lithium ion batteries 1-16 # were tested for 3 charge/discharge cycles at a charge and discharge rate of 0.5 C at room temperature, and then the barries were fully charged at a rate of 0.5 C, and the highest discharge capacity Q and the battery thickness T were recorded for the first three 0.5C cycles respectively. The fully charged batteries were stored at 60° C. for 30 days, and the battery thickness T0 and discharge capacity Q1 at 0.5 C were recorded after 30 days. Then the batteries were charged and discharged for 3 times at a rate of 0.5C at room temperature, and the highest discharge capacity Q2 for the 3 cycles were recorded. Thickness change rate, capacity retention rate, and capacity recovery rate of the batteries stored at high temperature were calculated t, and the results are shown in Table 1.

$$\text{Thickness change rate(\%)} = \frac{T_0 - T}{T} \times 100$$

$$\text{Capacity retention rate(\%)} = \frac{Q_1}{Q} \times 100$$

$$\text{Capacity recovery rate(\%)} = \frac{Q_2}{Q} \times 100$$

TABLE 1

| Lithium ion batteries | Capacity retention rate (%) after 200 cycles at normal temperature | % SOC (state of charge) stored at 60° C. for 30 days | | |
|---|---|---|---|---|
| | | Thickness change rate (%) | Capacity retention rate (%) | Capacity recovery rate (%) |
| 1# | 90.2 | 6.7 | 84.2 | 90.4 |
| 2# | 91.1 | 7.4 | 85.4 | 89.6 |
| 3# | 87.1 | 8.9 | 83.7 | 91.1 |
| 4# | 89.9 | 5.5 | 86.8 | 91.8 |
| 5# | 91.6 | 9.6 | 84.5 | 87.4 |
| 6# | 90.1 | 10.3 | 87.2 | 89.7 |
| 7# | 85.3 | 5.5 | 88.2 | 89.7 |
| 8# | 83.2 | 10.5 | 84.2 | 87.1 |
| 9# | 60.2 | 15.1 | 70.6 | 82.4 |
| 10# | 67.5 | 13.1 | 76.1 | 80.9 |
| 11# | 65.3 | 7.1 | 84.1 | 90.9 |
| 12# | 88.4 | 8.2 | 84.9 | 89.4 |
| 13# | 86.7 | 7.1 | 88.6 | 86.8 |
| 14# | 44.3 | 19.9 | 47.2 | 61.9 |
| 15# | 51.2 | 20.7 | 53.7 | 69.1 |
| 16# | 59.1 | 19.3 | 54.9 | 62.5 |

As can be seen from Table 1: the examples of the present application may significantly improve the cycle performance and storage performance of the lithium ion battery by adding a particular additive composition in the electrolyte of the lithium ion battery.

It should be noted that the above examples are only intended to illustrate the technical solutions of the present application, and will not limit the present application; although the present application has been described in detail referred to the foregoing examples, it should be understood by those skilled in the art that: the technical solutions recorded in foregoing examples may still be modified, or some or all of the technical features therein may be equivalently substituted; and these modifications or substitutions do not make the essence of the corresponding technical solutions depart from the scope of technical solutions of the examples of the present application.

What is claimed is:

1. An electrolyte, comprising the following components in percentages by mass: 10-20% of a lithium salt, 0.2-7% of an additive composition and a balance of a third solvent;
    wherein the additive composition is composed of a boron-containing lithium salt compound and a sulfur-based compound represented by Formula 1,

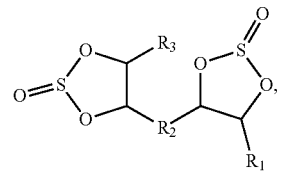

Formula 1 in which,
$R_1$ and $R_3$ are each independently selected from, halogen or a substituted alkyl;
$R_2$ is selected from a substituted or unsubstituted alkylene or is a direct bond;
the boron-containing lithium salt compound is 1-2% by mass of the electrolyte;
the sulfur-based compound is 1-5% by mass of the electrolyte; and
the lithium salt and the boron-containing lithium salt compound are different compounds, and the lithium salt contains no boron element.

2. The electrolyte according to claim 1, wherein the sulfur-based compound is 1-2% by mass of the electrolyte.

3. The electrolyte according to claim 1, wherein the sulfur-based compound is specifically selected from at least one of compounds shown in T2 and T3:

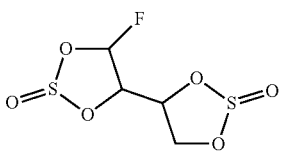

T2

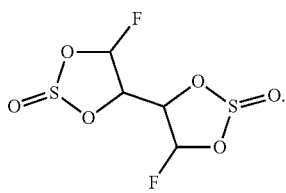

T3

4. The electrolyte according to claim 2, wherein the sulfur-based compound is specifically selected from at least one of compounds shown in T2 and T3:

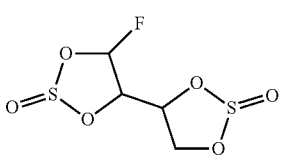

T2

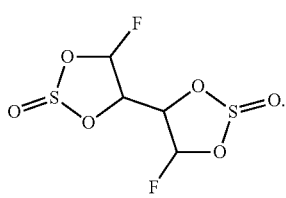

T3

5. The electrolyte according to claim 1, wherein the boron-containing lithium salt compound is selected from at least one of lithium difluoroacetate borate, lithium bisoxalate borate, and lithium tetrafluoroborate.

6. The electrolyte according to claim 2, wherein the boron-containing lithium salt compound is selected from at least one of lithium difluoroacetate borate, lithium bisoxalate borate, and lithium tetrafluoroborate.

7. The electrolyte according to claim 1, wherein the third solvent comprises at least one of ethylene carbonate and propylene carbonate.

8. The electrolyte according to claim 2, wherein the third solvent comprises at least one of ethylene carbonate and propylene carbonate.

9. The electrolyte according to claim 7, wherein at least one of ethylene carbonate and propylene carbonate is 10-50% by mass of the electrolyte.

10. A preparation method of the electrolyte according to claim 1, comprising:
    mixing a solvent, a lithium salt, and an additive composition under an inert atmosphere to obtain the electrolyte.

11. A lithium ion battery, comprising: the electrolyte according to claim 1, a positive electrode and a negative electrode;
    wherein a slurry of the positive electrode is composed of an active material of the positive electrode, a first conductive carbon black, a conductive graphite, a first adhesive, and a first solvent, and a slurry of the negative electrode is composed of an active material of the negative electrode, a second conductive carbon black, a second adhesive, a thickener, and a second solvent.

12. The electrolyte according to claim 1, the lithium salt is selected from at least one of lithium hexafluorophosphate, lithium bis (fluorosulfonyl) imide, and lithium bis (trifluoromethanesulfonyl) imide.

* * * * *